United States Patent [19]

Comert et al.

[11] Patent Number: 4,587,289

[45] Date of Patent: May 6, 1986

[54] ADHESIVE THERMOPLASTIC COMPOSITIONS

[76] Inventors: Ahmet Comert, 102h, rue Houlteau, 4655 Chaineux; Dominique Petit, 60, rue de Housse, 4512 Housse-Blegny, both of Belgium

[21] Appl. No.: 535,827

[22] Filed: Sep. 26, 1983

[30] Foreign Application Priority Data

Sep. 27, 1982 [FR] France ................................ 82 16218

[51] Int. Cl.⁴ .......................... C08L 77/12; C08L 9/00
[52] U.S. Cl. .................................... 524/505; 524/513; 524/514; 525/92; 525/167
[58] Field of Search .................. 525/92, 167; 524/505, 524/514, 513

[56] References Cited

U.S. PATENT DOCUMENTS

| | | | |
|---|---|---|---|
| 3,839,245 | 10/1974 | Schlossman | 524/227 |
| 4,011,286 | 3/1977 | Seymour | 525/92 |
| 4,110,411 | 8/1978 | Imanaka | 525/92 |
| 4,112,020 | 9/1978 | Callan | 525/92 |
| 4,130,603 | 12/1978 | Tanaka | 525/408 |
| 4,138,378 | 2/1979 | Doss | 525/92 |
| 4,169,822 | 10/1979 | Kutch | 525/92 |
| 4,181,635 | 1/1980 | Takamatsu | 525/92 |
| 4,218,549 | 8/1980 | Jadamus | 525/420 |
| 4,221,703 | 9/1980 | Hoeschele | 525/408 |
| 4,230,838 | 10/1980 | Foy | 525/408 |
| 4,242,470 | 12/1980 | Gergen | 525/92 |
| 4,268,570 | 5/1981 | Imanaka | 525/92 |
| 4,325,770 | 4/1982 | Korpman | 525/93 |
| 4,327,726 | 5/1982 | Kwong | 525/92 |

FOREIGN PATENT DOCUMENTS

| | | |
|---|---|---|
| 0009950 | 4/1980 | European Pat. Off. . |
| 2075990 | 11/1981 | United Kingdom . |
| 2090607 | 7/1982 | United Kingdom . |

*Primary Examiner*—John C. Bleutge
*Assistant Examiner*—Patricia Short
*Attorney, Agent, or Firm*—W. R. Hulbert

[57] ABSTRACT

The invention relates to new adhesive thermoplastic compositions.

The adhesive thermoplastic compositions according to the invention comprise at least one rubbery constituent and at least one resinous constituent and, if appropriate, other constituents, such as a plasticizer, filler and/or stabilizer, which are commonly incorporated into known adhesive thermoplastic compositions, generally called hot melts, but they also contain at least one special resin including regions of high cohesion incompatible with the rubbery constituent on the molecular scale, but miscible on the macroscopic scale.

The compositions according to the invention are particularly useful for sealing double glazing units.

6 Claims, 4 Drawing Figures

ADHESIVE THERMOPLASTIC COMPOSITIONS

The present invention relates to thermoplastic compositions exhibiting adhesive properties, that is to say compositions commonly called hot melts, and in particular thermoplastic sealing agents and compositions hereafter called hot melts.

Hot melt techniques are extremely diversified and range from the weakest types of glue bonding, for example in the cardboard trade, to the most difficult types of sealing, such as joining metal to metal, metal to glass and glass to glass.

The question of durable and perfectly leaktight metal to metal seals, for example for certain types of steelwork, or metal to glass seals, for example for light bulbs, and glass to glass seals, for example for double glazing, will be dealt with below with specific reference to double glazing, for which the criteria imposed are the strictest.

Double glazing must satisfy two conditions of primary importance, namely the permanent existence of a sheet of dry air preventing internal condensation, and the cohesion of the whole unit.

The sheet of dry air can be obtained by means of a desiccant (silica gel, molecular sieve or the like) located between the two panes, and of moisture barriers set up around the edge of the double glazing. The cohesion of the whole unit can be achieved by means of welding or glue bonding.

Welding the glass to itself or to an inserted metal frame provides perfect leaktightness and cohesion, but this technique has been abandoned because it is very difficult and expensive to carry out.

Glue bonding by means of polysulfides and, more rarely, with the aid of other crosslinked elastomer polymers, which are applied cold as a mixture with a catalyst, does not provide perfect leaktightness, which can only be achieved by the additional application of a hydrocarbon polymer which is perfectly hydrophobic but of low cohesion. The cohesion of the whole unit is acquired by virtue of the second crosslinkable polymer, but at the expense of rather slow polymerization (up to 24 hours), which remains dependent on the dose and the activity of the catalyst. Briefly, crosslinkable elastomers are suitable for industrial manufacture with specialized means, but are hardly suitable for the work of the small craftsman in glazing.

A more recent technique, which is mentioned in French Pat. No. 73 14086, is to apply hot melts, which are not crosslinked and permit immediate use. A new improvement in this field is the coating, on three faces, of the spacer bars forming the frame on either side of which the two panes are placed.

The limitations of the current technique are related to the character of sealing agents whereby they melt when heat is applied, the sealing agents being reversible thermoplastics; there are a certain amount of flow when cold (and a fortiori when hot), and, consequently, if the units are stored under conditions where the two panes are not supported simultaneously by their lower edge, the unsupported pane can slide downwards and, in the worst cases, lose the leaktightness.

The object of the present invention is to improve the sag resistance of joints produced by means of hot melts, and in particular the creep resistance of double glazing, by the addition, to the conventional hot melt compositions, of a resin which gives these hot melts satisfactory properties in the areas of cohesion and impermeability to water vapor.

For this purpose, the invention relates to a hot melt of otherwise conventional composition, comprising at least one rubbery constituent and at least one resinous constituent, whose composition includes a "special resin" miscible with the rubbery constituent on the macroscopic scale, this special resin including regions of high cohesion incompatible with the rubbery constituent on the molecular scale, and regions of low cohesion compatible with the same rubbery constituent on the molecular scale. This special resin imparts a better sag resistance, has certain synergic effects and increases the modulus of this rubbery constituent, even for small elongations.

Apart from these rubbery and resinous constituents and the said special resin, the adhesive thermoplastic composition according to the invention can comprise other constituents which usually form part of the composition of a hot melt, and in particular plasticizers, fillers and/or stabilizers.

The hot melts according to the invention will be described below by defining more precisely the various constituents which they comprise or may comprise, and the relative amounts of these constituents.

In the description given below of the compositions according to the invention, unless indicated otherwise, the amounts are indicated in parts by weight per 100 parts by weight of the rubber which is one of the constituents.

The hot melts according to the invention always comprise a number of constituents which are divided up into the following categories:
the rubbers
the resins
the "special resins".

Depending on the relative amounts and the particular type of the constituents falling into these first three categories, and depending on the particular type of composition required, the hot melts according to the invention can also comprise one or more of the constituents which are divided up into the following categories:
plasticizers
fillers
stabilizers and various other constituents.

The rubber present into the hot melts of the invention constitutes the elastomer base, the purpose of which is to absorb shocks at low temperature and to form the barrier to water vapor, in addition to keeping the so-called tackifiers in dispersion, the tackifiers being the agents which give a tacky character to the mixture into which they are incorporated.

The specific compositions according to the present invention contain 100 parts by weight of one or more rubbery constituents which consist, at least in part, of one or more "virgin" rubbery constituents chosen from amongst solid elastomeric polymers having a molecular weight of about 15,000 to 200,000 or 300,000 or more. These polymers and the tradenames by which they are sometimes known include in particular, the butyl rubbers such as isobutylene/isoprene copolymers, polyisobutylene ("Vistanex L"), styrene/butadiene polymers ("GRS" and "Kraton SBS"), styrene/isoprene polymers ("Kraton SIS"), hydrogenated styrene/butadiene and styrene/isoprene polymers ("Kraton SEBS"), and the halogenated rubbers ("Parlon").

The butyl rubber used according to the invention can be any type of butyl rubber having a Mooney viscosity (ML 1+3 at 127° C.) of about 30 to 80, namely an isobutylene homopolymer or alternatively a copolymer of isobutylene with a small amount, for example about 1 to 5 mol %, of a conjugated diene or polyene such as, inter alia, butadiene, isoprene, piperylene or 2,3-dimethylbutadiene. This butyl rubber can be slightly crosslinked and consist of one of the products conforming to U.S. Pat. No. 3,674,735. Special preference is given to butyl rubbers having a Mooney viscosity, such as defined above, of about 50 to 60, corresponding to a molecular weight of approximately 450,000, which have a degree of unsaturation of about 1,5 mol % and, after vulcanization at 150° C. for 40 minutes of a standardized mixture, a modulus at 300% elongation of about 7 to 9 Mpa, an ultimate tensile strength of 16 Mpa and an elongation at break of 450%. An example of a rubber of this kind is Polysar P301.

Apart from the "virgin" rubbery constituents as listed above by way of examples, the hot melts according to the invention can also comprise regenerated rubbers and/or prevulcanized rubbers.

An example of a regenerated rubber which can be used is a rubber having an ultimate tensile strength of 8.8±1.6 Mpa and an elongation at break of 525±40%. A prevulcanized rubber which can be used in particular is the rubber Kalar 5214.

As indicated above, the amount represented by all the rubbery constituents forming part of the composition of the hot melts according to the invention is considered as the reference amount namely 100 parts by weight.

It is generally advantageous for at least a major part, that is to say at least half (at least 50 parts), of this amount of rubbery constituents to be formed of one or more "virgin" rubbers, it being possible for the remainder (from 0 to 50 parts) to be represented by regenerated rubbers and/or prevulcanized rubbers.

The resins form the second class of functionally important constituents of the hot melts of the invention. They can be chosen, in particular, from amongst the following types:

(a) Aliphatic hydrocarbon resins and coumarone/indene resins, which have a softening point (ring and ball) of about 100° C., of the kind described in U.S. Pat. No. 4,294,733, for example the resin Escorez (Esso) taken in amount of up to 500 parts and preferably of about 165 parts. Another suitable resin is Imprez (ICI).

It is generally advantageous for at least part of the amount of resinous constituents of the hot melts according to the invention to be represented by one or more aliphatic hydrocarbon resins and/or one or more coumarone/indene resins. It is the resins of this kind, in particular, which constitute the tackifiers of the composition.

(b) Aromatic resins (polymers of $C_8$ cuts) or terpenephenolic resins, having a softening point (ring and ball) of up to 200° C., for example the resin Nirez having a softening point (ring and ball) of 150° C., taken in an amount of up to 300 parts and preferably of about 100 parts. Another suitable resin is the resin Piccofyn (Hercules).

(c) EVA resins, or ethylene/vinyl acetate copolymers, having a melt flow index, usually called MFI, of not more than 700 and preferably of about 25, for example an EVA resin containing 28% of vinyl acetate and having an MFI of 22 to 28, such as the resin Elvax (Dupont), taken in an amount of up to 200 parts and preferably of about 100 parts. It is the EVA resins, in particular, which are widely used in all adhesive compositions for ensuring a good spread and a good adhesion to metals.

The list of resins indicated above is not exhaustive and other resinous constituents, especially those used in known hot melt compositions, can also form part of the composition of the hot melts according to the invention.

The relative amount of the resinous constituent or constituents of the composition can vary within fairly wide limits according to the resins used and the particular properties which it is desired to impart to the hot melt.

As a general rule, all the resinous constituents incorporated into the composition will represent from 50 to 1,000 parts and advantageously from 100 to 500 parts.

The third class of essential constituents of the hot melts according to the invention is formed by the "special resins", which will be defined below.

In the same way as the resins which form part of the second class of constituents as described above, the "special resins" obviously form part of a very large number of substances called "resins".

For the purpose of describing the object of the present invention, however, it is useful to consider these "special resins" as forming a separate class of constituents because it is essentially the incorporation of these "special resins" into the composition which constitutes the novelty and the originality of the hot melts according to the invention, compared with the known hot melts.

It is a virtue of the incorporation of these "special resins" that the hot melts according to the invention have advantageous properties in comparaison with analogous hot melt compositions which do not comprise these "special resins".

The "special resins" which form part of the third class of the essential constituents of the hot melts according to the invention are resins which incorporate regions of high cohesion incompatible with the rubbery constituent on the molecular scale, but which are miscible on the macroscopic scale.

In general, the resins which are called "special resins" in the present specification form part of the class of the block or multiblock copolymers consisting of elastomeric segments and rigid segments of high cohesion.

More particularly, the said elastomeric segments consist of polyols, polyethers ou polyesters and the rigid segments of high cohesion consist of poly(tetramethylene terephthalate), polyurethanes, polyamides or copolyamides.

Examples of these block or multiblock copolymers wich are commercially available are as follows (designated by their tradename): Pebax (ATO) and Pellethane (Upjohn).

It is these block copolymers which give the hot melts of the invention their superiority over analogous products by improving, in particular, the flow resistance when cold and even when hot.

According to an advantageous embodiment of the invention, these block copolymers consist of copolyetheresteramides which are formed of the product resulting from the copolycondensation of an $\alpha,\omega$-dicarboxylic polyamide or copolyamide having a molecular weight of 300 to 15,000 and preferably of 400 to 5,000, employed in an amount of 90 to 5% by weight, and of an aliphatic $\alpha,\omega$-dihydroxylated polyoxyalkylene having a molecular weight of 100 to 6,000 and preferably of 200 to 5,000, employed in an amount of 10 to 95% by weight, the said product having a softening point (ring and ball) of between 80° and 210° C. and preferably of 100° to 200° C., and a viscosity in the molten state of 10 to 2,000 Pa.s at 200° C.

According to one embodiment, the said condensation product comprises 60 to 20% of the said polyamide or copolyamide and 40 to 80% of the said α,ω-dihydroxylated polyoxyalkylene.

Preferably, the said "special resin" is a block polyetheresteramide formed of CoPA 6.11/PPG/PTMG, PA 12/PTMG or CoPA 6.12/PPG. The abbreviations have the following meansings:
PPG: polyoxypropylene glycol
PTMG: polyoxytetramethylene glycol
PA: polyamide
CoPA: copolyamide
6, 11 or 12: respectively, polyamide-6, 11 or 12.

More particularly, the said special resin can consist of a block copolyetheresteramide wich has a softening point (ring and ball) of 120° to 190° C. and a viscosity in the molten state of 100 to 800 Pa.s at 200° C., and which corresponds to the formula:

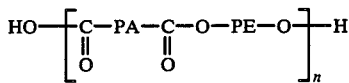

in which:

PA represents a rigid polyamide segment having a molecular weight of approximately 500 to 2,000, and PE represents a flexible polyether segment having a molecular weight of approximately 1,000 to 3,000.

The amount of special resin in the composition of the hot melts according to the invention can vary within fairly wide limits. In general, the compositions will comprise from 1 to 300 parts of one or more special resins and more particularly from 10 to 150 parts. An example of a special resin of this type is Pebax (ATO), which is used in an amount of up to 250 parts, preferably of 10 to 150 parts and especially of 30 to 80 parts.

The fourth class of constituents which the hot melts of the invention can comprise includes plasticizers, which are divided into:

(a) Polyisobutylenes of low molecular weight, namely of at most 50,000, which impart the adhesion to glass, for example Vistanex LM taken in an amount of up to 500 parts and preferably of 100 parts. Similar suitable polymers are the polybutene Hyvis (BP) and Indopol (Amoco).

(b) Atactic polypropylenes, which are the hydrocarbon-soluble residue from the polymerization of propylene by the Ziegler-Natta process. A polymer of this type makes the flow rate uniform when the hot melts are applied. An example of these polymers is Vispol (Interchimica) taken in an amount of up to 250 parts and preferably of about 40 parts. Another useful agent of this type is Afax (Hercules).

(c) Naphthenic oils, the addition of which is optional and whose purpose is to adapt the viscosity to the characteristics of the extrusion machines. Examples of these oils are Enerthene (BP) and Coray (Esso). The amount of naphthenic oil could be up to 300 parts.

The fifth class of constituents which the hot melts of the invention can comprise includes fillers. The purpose of these is to reinforce, to protect against ultraviolet radiation and to absorb infrared radiation. The fillers can be of organic type, such as carbon black, for example FEF Sterling, taken in an amount of up to 300 parts and preferably of 50 to 100 parts, or alternatively of inorganic type, such as chalk, talc, titanium dioxyde, asbestos, fibers, clay or silica, inter alia, the addition of which is optional and can amount to 200 parts.

The sixth class of constituents which the hot melts can comprise includes stabilizers and additives making it possible to optimize the properties of the product according to requirements.

The stabilizer used can be any stabilizer commonly used for rubbers, plastics and resins, for example Irganox 1010 (Ciba-Geigy), in an amount of up to 20 parts and preferably of 3 to 5 parts.

The glass/hot melt bond can be improved by means of an organosilane, which may or may not be coupled with an epoxy resin. Amongst the silanes used there may be mentioned those sold under the names A-172, A-186, A-187, A-153 and A-151 (Union Carbide Corporation). These organosilanes are used at concentrations ranging, for example, from 0.5 to 30 parts and preferably of about 15 parts.

The invention is illustrated by the specific examples below, with reference to the attached drawings; in these drawings.

In the examples, the useful properties of the hot melts are measured and compared by means of the tests described below.

a. Static shear (sag)

Figure 1:
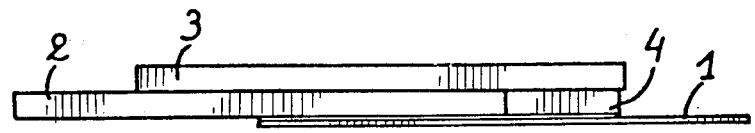
FIG. 1 is a simplified side view showing the assembly of a test piece for a flow test.

1. As indicated in FIG. 1, the following are placed successively on a plane surface: a galvanized steel plate 1 (75 mm×150 mm×1 mm), a glass plate 2 (75 mm×150 mm×6 mm) protected by silicone-coated paper to serve as a spacer and offset by 35 mm, and a second glass plate 3 having the same dimensions, offset by 10 mm relative to the steel plate.

2. The hot melt 4 is extruded between the steel and glass plates. A 10 kg weight is placed on the whole structure, which is left to cool for 30 minutes. The surplus hot melt 4 is removed by means of a heated knife so as to give a joint of 25 mm×75 mm'6 mm.

3. One hour after assembly, the glass spacer is removed, the position of the steel plate relative to the glass is marked and the test piece is suspended, by means of a hole made in the steel plate in an oven at 85°±2° C. for 1 hour, with the glass facing downwards.

4. The test piece is removed from the oven and the slip of the glass away from the initial mark is measured. The value is rounded off to the nearest millimeter.

b. Peel strength at 180° on a test piece

Figure 2:
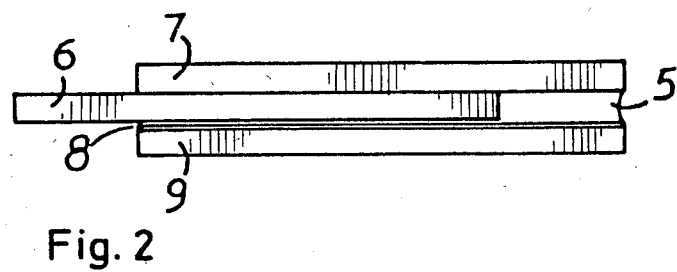
FIG. 2 is simplified side view showing the assembly of a test piece for a peel strength test at 180°.

1. As indicated in FIG. 2, the test pieces are prepared by extruding the hot melt 5 into the gap made by a silicon-treated glass plate 6 (25 mm×150 mm×4 mm) between a clean virgin glass plate 7 (25 mm×150 mm×4 mm) and a new aluminum foil 8 (25 mm×150 mm×0.1 mm) placed on a supporting glase plate 9 (25 mm×150 mm×4 mm). After extrusion, pressure is applied with the hand and the surplus is removed to give a sealing area of 25 mm×50 mm. The whole structure is left to cool for about 10 minutes and the silicone-treated glass plate is removed.

2. The test pieces are conditioned for 4 hours at ambient temperature (23±2° C.) before being subjected to ageing, if appropriate.

3. After ageing, the test pieces are allowed to return to ambient temperature (60 minutes).

4. The test pieces are placed in the tensile testing machine operating at a speed of 50 mm/minute.

5. All the peel strength values must be measured at ambient temperature (23±2° C.).

6. The peel strength test consists in pulling the aluminum foil off the glass plate, forming an angle of 180° by folding back the free end of the aluminum foil.

7. The value of the peel strength is equal to the average of 3 values measured for each conditioning operation.

8. If breaking occurs, it must be stated whether this is cohesive or adhesive. It is cohesive if it occurs within the hot melt. It is adhesive if it occurs at the junction between the hot melt and the substrate and, according to the particular case, is referred to as glass-adhesive or aluminum-adhesive.

9. The accuracy is estimated to be ±15%.

c. Dynamic shear test

Figure 3:
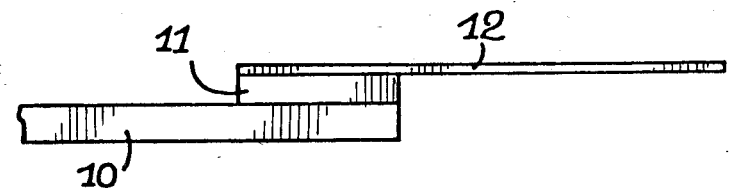
FIG. 3 is a simplified side view showing a test piece for a dynamic shear test.

1. Using the same general conditions as for the flow test and peel strength test, with a adapted arrangement, test pieces such as shown in FIG. 3 are prepared, which comprise a 4 mm thick glass plate 10, a seal 11 of 25 mm×25 mm over a thickness of 4 mm, and a galvanized steel plate 12.

2. After conditioning for 24 hours at ambient temperature (23±2° C.), a tensile force of 10 mm/minute is exerted at 25° C. using a tensile testing machine.

3. The tabulated value is the average of 3 measurements.

d. Creep Test

Figure 4:
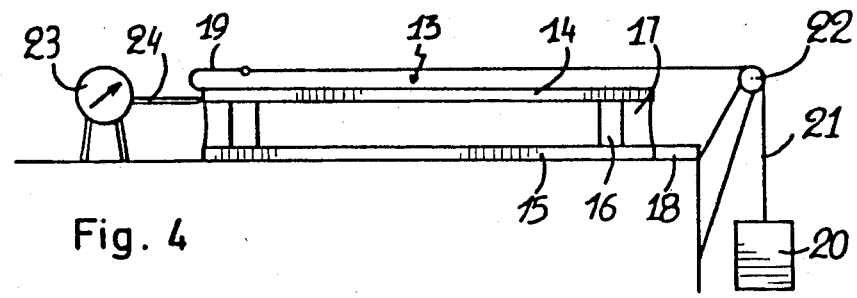
FIG. 4 is a simplified side view of the arrangement for measuring the movement in a double glazing unit.

1. Double glazing units 13 of 350 mm×500 mm are constructed as illustrated in FIG. 4; their 4 mm thick panes 14, 15 are separated by 12 mm wide aluminum spacers 16 filled with a 3 Å molecular sieve, the whole structure being assembled by the conventional process for extrusion of the hot melt 17.

2. The creep test is carried out in accordance with the technique recommended by the Dutch KOMO Institute under the designation K24, the lower pane 15 being held against an abutment 18 while the upper pane 14 is pulled, along the 350 mm side, by means of a hook 19 on which a 10 kg weight 20 pulls via a wire 21 passing over a pulley 22. A comparator having a precision of 0.01 mm, which is mounted at 23 and whose pointer on the glass plate under tension, makes it possible to measure the movements as a function of time.

The invention is illustrated further, without being limited, by the examples which follow.

To carry out the examples, a number of hot melts, whose compositions are given in Table I, are prepared.

TABLE I

| | Hot melts | | | | | | | | |
|---|---|---|---|---|---|---|---|---|---|
| | 1 | 2 | 3 | 4 | 5 | 6 | 7 | 8 | 9 |
| Butyl rubber | 74 | 74 | 74 | 74 | 74 | 74 | 74 | 74 | 74 |
| Regenerated butyl Vredestein P90R | 26 | 26 | 26 | 26 | 26 | 26 | 26 | 26 | 26 |
| Hydrocarbon resin Escorez 1304 | 122 | 122 | 122 | 122 | 122 | 122 | 122 | 122 | 122 |
| Terpene-phenolic Nirez 2150 | 74 | 74 | 74 | 74 | 74 | 74 | 74 | — | 74 |
| Block copoly-etheresteramide Pebax HM1 | — | 20 | 44 | 88 | 44 | 44 | 44 | 44 | 44 |
| Ethylene/vinyl acetate copolymer I* | 74 | 74 | 74 | 74 | — | 37 | — | 74 | 74 |
| Ethylene/vinyl acetate copolymer II** | — | — | — | — | 74 | 37 | — | — | — |
| Low molecular weight polyisobutylene Vistanex LM | 74 | 74 | 74 | 74 | 74 | 74 | 74 | 74 | 74 |
| Atactic polypropylene Vispol 3000 | 41 | 41 | 41 | 41 | 41 | 41 | 41 | 41 | 41 |
| Carbon black | 74 | 74 | 74 | 74 | 74 | 74 | 74 | 74 | 74 |
| Antioxidant | 4 | 4 | 4 | 4 | 4 | 4 | 4 | 4 | 4 |
| Organosilane A-172*** | — | — | — | — | — | — | — | — | 11 |

*Elvax, MFI = 25
**Elvax, MFI = 0,3
***A-172: vinyltrimethoxyethoxysilane

EXAMPLE 1

Influence of the proportion of block copolyetheresteramide

The sag test on a test piece (or static shear), the peel strength test at 180° and the hardness test (Shore A) are carried out on hot melts 1, 2, 3 and 4.

The results collated in table II demonstrate that the copolyetheresteramide Pebax (hot melts 2, 3 and 4) is essential and has an effective action even at low concentration, the best results being obtained with the hot melts comprising at least 44 parts of Pebax.

TABLE II

| Hot melt | Sag at 85° C. over 1 hour (mm) | Peel strength at 180° (N/cm) | Hardness (Shore A) |
|---|---|---|---|
| 1 | 45 | 80 | 52 |
| 2 | 10 | 118 | 47 |
| 3 | 4 | 90 | 42 |
| 4 | 3 | 88 | 32 |

EXAMPLE 2

Influence of the ethylene/vinyl acetate copolymers

The same tests as in Example 1 are carried out on hot melts in which the proportion of ethylene/vinyl acetate copolymer varies.

The results collated in Table III show that these copolymers are necessary (hot melts 5, 6 and 3) for a good sag resistance, the best adhesion being imparted by an EVA copolymer having an medium MFI (hot melt 3).

TABLE III

| Hot melt | Sag (mm) at 85° C. over 1 hour | Peel strength at 180° (N/cm) |
| --- | --- | --- |
| 5 | 5 | 74 |
| 6 | 4 | 79 |
| 3 | 4 | 90 |
| 7 | 11 | 72 |

EXAMPLE 3

Influence of the terpene-phenolic resin

In addition to the flow test and the peel strength test at 180°, the viscosity in the molten state is estimated by extrusion using a Monsanto Capillary Rheometer at 175° C. under 40 kPa, with a 15:1 capillary.

The results given in Table IV show that the terpene-phenolic resin, although lowering the sag resistance, imparts a better viscosity in the molten state (which is important for pumps) and a better adhesion.

TABLE IV

| Hot melt | Sag (mm) at 85° C. over 1 hour | Peel strength at 180° (N/cm) | Viscosity (Poises) |
| --- | --- | --- | --- |
| 3 | 4 | 90 | 520 |
| 8 | 2 | 58 | 750 |

EXAMPLE 4

Resistance to ageing

Test pieces for the peel strength test and for the dynamic shear test, constructed using hot melts 1 and 3, are subjected to various ageing conditions for a period of 2 weeks.

The ageing conditions are:
(1) In an oven at high humidity (65° C., relative humidity of 95%)
(2) In a water bath at 60° C.
(3) In a water bath at 25° C. under UV irradiation (conditions described in testing technique P10 of the "Sealed Insulating Glass Manufacturers Association" (SIGMA), United States of America)
(4) In dry heat at 60° C.
(5) Unter alternating 6-hour climatic cycles comprising
   1st hour: from 25° C. to 60° C., with spraying to simulate rain during the first 30 minutes
   2nd hour: holding at 60° C.
   3rd hour: from 60° C. to 25° C.
   4th hour: from 25° C. to −30° C.
   5th hour: holding at −30° C.
   6th hour: from −30° C. to +25° C.
and including intense UV irradiation for the first 3 hours (in accordance with ASTM Standard Specification EG-PI).

For conditions (3) and (5), the transparent face is exposed to the UV radiation.

The results are collated in Table V.

TABLE V

| | Accelerated ageing | | | |
| --- | --- | --- | --- | --- |
| | Peel strength (N/cm) Hot melt | | Dynamic shear (N/cm$^2$) Hot melt | |
| Ageing conditions | 1 | 3 | 1 | 3 |
| Initial | 80 | 90 | 20.4 | 21.7 |
| High humidity | 55 | 81 | 20.0 | 22.4 |
| Hot water | 65 | 84 | 21.2 | 23.3 |
| Water + UV | 85 | 107 | 14.7 | 15.4 |
| Heat | 69 | 76 | 20.6 | 22.0 |
| Climatic cycles | 57 | 71 | 13.2 | 15.1 |

It may be concluded that the block copolyetheresteramide has a beneficial action on preserving the adhesion properties under various ageing conditions.

EXAMPLE 5

Effect of the block copolyetheresteramide in heavy glazed units

A creep test, as described in paragraph d above, is carried out on double glazing units assembled using hot melts 1 and 3, applied in the conventional manner; this test makes it possible to simulate to a certain extent the loads which exist in double glazing units of very large dimensions, while at the same time working on a convenient scale.

The results given in Table VI show the creep resistance of the glazed units under a very strong pull is considerably improved by the bloc copolyetheresteramide.

EXAMPLE 6

Effect of the block copolyetheresteramide in heavy glazed units mounted on coated spacer bars The same experiments as in Example 5 are carried out on double glazing units assembled using spacer bars coated on 3 sides beforehand.

The results given in Table VI demonstrate the same usefulness of the block copolyetheresteramide.

TABLE VI

| | Creep (mm) of a glazed unit under a 10 kg load (Komo K24 test) | | | |
| --- | --- | --- | --- | --- |
| Load application time | Conventional unit Hot melt | | Coating on 3 sides Hot melt | |
| | 1 | 3 | 1 | 3 |
| 10 minutes | 0.37 | 0.04 | 0.06 | 0.03 |
| 24 hours | 1.48 | 0.26 | 0.23 | 0.08 |
| 7 days | 2.00 | 0.40 | 0.64 | 0.14 |

Moreover, comparison of the results achieved by the conventional technique (extrusion) and those achieved with coating on 3 sides shows that the improvement factor provided by a hot melt of the invention is approximately the same in both cases.

EXAMPLE 7

Effect on vinyltrimethoxyethoxysilane on the resistance to a combination of UV with water Double glazing units assembled using hot melts 3 and 9, applied in the conventional manner, are immersed in a water bath to a depth of approximately 5 cm below the surface.

The whole structure is exposed to ultraviolet rays by means of 2 UV lamps. Amongst these lamps, there may be mentioned those sold under the reference "PHILIPS MLU 300 W B22 3 UV". The penetration of water into the double glazing unit is checked visually by the separation which takes place between the glass and the hot melt, caused by UV bombardment. The minimum number of days of exposure necessary, over a number of samples subjected to this test, for the water to penetrate into the double glazing unit is thus recorded. The results are collated in table VII.

TABLE VII

| Minimum number of days before the penetration of water into the double glazing unit. | |
|---|---|
| Hot melt | Minimum number of days |
| 3 | 40 |
| 9 | 120 |

This shows the considerable increase in the life of a double glazing unit subjected to the conditions described above, when this double glazing unit is constructed with hot melt 9 which contains an agent for coupling with glass, in this case vinyltrimethoxyethoxysilane, as in the example mentioned.

To summarize, the invention provides new hot melts which have a better sag resistance, which are suitable for application by conventional techniques (follower-plate pump and gun) or techniques of coating on 3 sides, which have a lower hardness and a better impact strength (ease of transportation and handling), which have a better ageing resistance, which have a better resistance to the expansion of the unit under the effect of temperature differences and which have a better resistance to asymmetrical overloads than hot melts which do not contain the special resin used in the compositions of the invention.

Of course, the invention is not limited to the embodiments which have been described and shown by way of non-limiting examples, and it can form the subject of numerous modifications without exceeding the scope of the invention.

We claim:

1. A thermoplastic, thermofusible adhesive composition comprising as essential elements:
   (1) 100 parts of a butyl rubber having a Mooney viscosity (ML 1+3 at 127° C.) of 30 to 80,
   (2) 50 to 1000 parts resinous constituents comprising:
      (a) an adhesion improving amount up to 300 parts terpene-phenolic resin having a softening point (ring and ball) of up to 200° C.;
      (b) a sag resistance improving amount up to 200 parts ethylene-vinyl acetate copolymer having a melt flow index of not more than 700; and
      (c) 0 to 500 parts aliphatic hydrocarbon resin, coumarone- indene resin, or a combination thereof having a softening point (ring and ball) of about 100° C.;
   (3) 1 to 300 parts of a block copolyetheresteramide consisting of a product resulting from the polycondensation of an α, ω-dicarboxylic polyamide or copolyamide having a number average molecular weight of 300 to 15,000, employed in an amount of 90 to 5% by weight and of an aliphatic α, ω-dihydroxylated polyoxyalkylene having a number average molecular weight of 100 to 6,000, employed in an amount of 10 to 95% weight, the said polycondensation product having a softening point (ring and ball) of between 80° and 210° C. and a viscosity in the molten state of 10 to 2,000 Pa.s (200° C.);
   (4) an adhesion improving amount up to 500 parts of polyisobutylene having a number average molecular weight of at most 50,000; and
   (5) a reinforcing amount up to 300 parts of fillers.

2. A composition as claimed in claim 1, wherein the said block copolyetheresteramide has a softening point (ring and ball) of between 100° and 200° C. and consists of a product resulting from the polycondensation of a polyamide or copolyamide having a number average molecular weight of 400 to 5,000, employed in an amount of 60 to 20% by weight, and of an aliphatic, α,ω-dihydroxylated polyoxyalkylene having a number average molecular weight of 200 to 5,000, employed in an amount of 40 to 80% by weight.

3. A composition as claimed in claim 2, wherein the block copolyetheresteramide has a softening point (ring and ball) of 120° to 190° C. and a viscosity in the molten state of 100 to 800 Pa.s at 200° C., and corresponds to the formula:

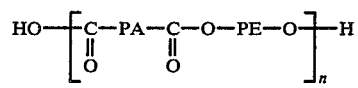

in which:
PA represents a rigid polyamide segment having a number average molecular weight of approximately 500 to 2,000 and
PE represents a flexible polyether segment having a number average molecular weight of approximately 1,000 to 3,000.

4. A composition as claimed in claim 1, which contains 10 to 150 parts by weight of the said block copolyetheresteramide per 100 parts by weight of butyl rubber.

5. A composition as claimed in claim 1, which also comprises at least one stabilizer.

6. A composition as claimed in claim 1, which also comprises at least one plasticizing constituent other than polyisobutylene.

* * * * *